United States Patent

McIntyre

[15] 3,638,256
[45] Feb. 1, 1972

[54] MOTOR-PROPELLED FISHING FLOAT

[72] Inventor: Hubert L. McIntyre, 1406 E. Tonkawa, Tonkawa, Okla. 74653

[22] Filed: Feb. 24, 1970

[21] Appl. No.: 13,399

[52] U.S. Cl. .................................................9/1 R, 248/4
[51] Int. Cl. .............................................B63b 35/00
[58] Field of Search ........................9/1 R, 1 A, 2 R, 2 C, 2 F, 9/2 S, 2 A, 5, 6, 6.5, 7, 8, 3, 4 R; 114/0.5; 115/1 A, 1 R, 17, 18 R, 18 A, 18 B, 18 E; 248/2–4, 12, 159, 224

[56] References Cited

UNITED STATES PATENTS

| 3,324,488 | 6/1967 | Schulz, Jr. | 9/1 A |
| 3,471,875 | 10/1969 | Lyon | 9/2 |
| 2,782,052 | 2/1957 | Albrecht et al. | 248/4 X |

FOREIGN PATENTS OR APPLICATIONS

| 2,005,206 | 12/1969 | France | 248/4 |

Primary Examiner—Milton Buchler
Assistant Examiner—F. K. Yee
Attorney—Robert K. Rhea

[57] ABSTRACT

In a fishing float a horizontally disposed open framework reinforced polygonal-shaped buoyant body is provided with a seat-equipped central opening. An upstanding transom, at one end of the body, supports an outboard motor. An upwardly open recess, in the other end portion of the body, receives a battery for providing electrical energy to the motor.

5 Claims, 6 Drawing Figures

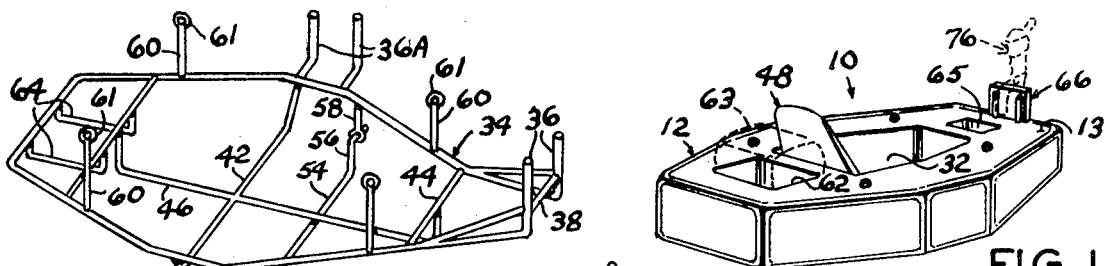
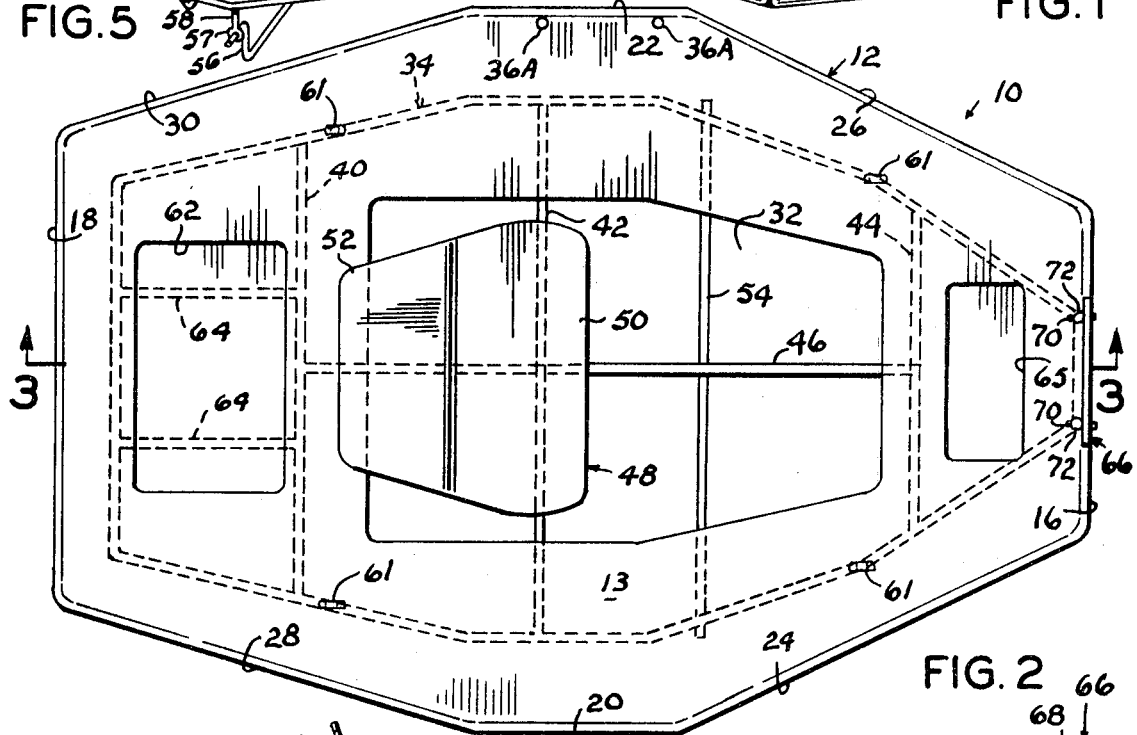
HUBERT L. McINTYRE
INVENTOR.
BY
Robert K. Rhea
AGENT

MOTOR-PROPELLED FISHING FLOAT

BACKGROUND OF THE INVENTION

1. Field of the Invention

The present invention relates to fishing floats and more particularly to a motor-propelled fishing float.

Various types of fishing floats are presently in use. For the most part conventional fishing floats are substantially doughnut-shaped having a fabric seat attached to a buoyant body for supporting a fisherman surrounded by the float. For the most part these conventional fishing floats are formed by an endless pneumatic tube confined by a surrounding fabric covering. Such a float is not adaptable for the use of auxiliary propelling means such as a trolling motor.

This invention, on the other hand, provides a float formed of lightweight material which is reinforced by a metallic frame to add rigidity and provide sufficient mass for supporting a small outboard motor at one end of the float.

2. Description of the Prior Art

U.S. Pat. Nos. 1,966,576; 2,327,169, and 2,674,753 relate to seat-equipped pneumatic floats which are propelled by the user. U.S. Pat. No. 2,698,477 discloses an inflatable boat having facilities for mounting a motor thereon. U.S. Pat. Nos. 2,803,837 and 3,067,441 respectively disclose a boat and float, each being propelled by foot action of the user.

SUMMARY OF THE INVENTION

A somewhat elongated generally horizontal disposed polygonal-shaped body is formed from a desired buoyant material. The float is generally rectangular in cross section and is provided with a central opening of greater area than a user of the float. A metallic open framework, preferably formed of tubular material in the general configuration of the body, is imbedded within the material of the float in spaced relation with respect to its marginal edges. Cross braces, extending through the depending limit of the central opening, supports a seat in turn supporting a user and preventing accidental passage of the user through the float when the latter is waterborne. The frame projects upwardly at one end of the body to form a transom support for a trolling motor, or the like, at the forward end of the float. An upwardly open recess, formed in the float body rearwardly of the seat, supports a battery for energizing the motor. Similarly, a recess, formed in the forward end of the float body, provides a receptacle for storing fishing equipment, or the like.

BRIEF DESCRIPTION OF THE DRAWINGS

FIG. 1 is a perspective view of the float illustrating, by dotted lines, a trolling motor, and battery box cover;

FIG. 2 is a top view of the float, to an enlarged scale, illustrating the reinforcing framework by solid and dotted lines;

FIG. 3 is a vertical cross-sectional view taken substantially along the line 3—3 of FIG. 2;

FIG. 4 is a front end elevational view of the float;

FIG. 5 is a perspective view, to a different scale, of the reinforcing framework, per se; and, FIG. 6 is a fragmentary cross-sectional view taken substantially along the line 6—6 of FIG. 4.

DESCRIPTION OF THE PREFERRED EMBODIMENT

Like characters of reference designated like parts in those figures of the drawings in which they occur.

In the drawings:

The reference numeral 10 indicates the device, as a whole, comprising a generally horizontally disposed body 12. The body 12 is preferably molded in the polygonal shape shown and is formed of synthetic lightweight material, such as plastic having a density less than water and preferably heat-sealed at its outer surfaces to form an impervious surface. The body 12 is a selected thickness from its top surface 13 to its bottom surface 14 and is characterized by a forward vertical end wall or bow 16 parallel with and narrower than a rearward end or stern wall 18 and having opposing parallel sidewalls 20 and 22 with the bow, stern and sidewalls joined by front sidewalls 24–26 and rear sidewalls 28–30 extending respectively in diverging relation from the bow wall 16 and stern wall 18 and merging with the respective forward and rearward limit of the sidewalls 20 and 22. The overall length of the body 12 is greater than its transverse width.

A polygonal-shaped opening 32 is formed in the central portion of the body. The size of the opening 32 is great enough to freely receive an operator as hereinafter described. The bottom surface 14 is inclined upwardly and forwardly, as at 33, from the forward limit of the opening 32 and intersects the vertical plane of the forward wall 16.

An open-type framework, indicated generally at 34 (FIG. 5), has the major portion thereof embedded in the material forming the body when the latter is molded to add rigidity to the lightweight material. The frame 34 is preferably formed from a substantially continuous length of lightweight tubular material defined by front, side and rearward portions spaced inwardly of the respective sides and stern end of the body 12 around the opening 32 with its front end portion adjacent the forward limit of the bow or wall 16. The front end of the frame is characterized by a pair of parallel suitably braced upstanding legs 36 terminating in the plane of the upper surface 13 of the body 12 adjacent its forward wall 16 for the purposes presently explained.

The two upstanding legs 36 are interconnected by a cross brace 38 parallel with respect to the forward wall 16. The frame 34 is provided with transverse braces 40, 42, and 44. A longitudinally extending brace 46 is connected, at its respective ends, to the cross braces 40 and 44 and intermediate its ends, to the cross brace 42. The cross braces 42 and 46, intermediate their ends, intersect the opening 32 adjacent the limit of the lowermost surface or plane 14 of the body 12. The braces 42 and 46 support a seat 48 which in turn supports an occupant or user. The seat bottom or panel 50 rests on the cross brace 42 and longitudinal brace 46 while the seat back 52 extends angularly upward and rearwardly adjacent the rearward limit of the opening 32. The longitudinal brace 46, between the seat panel 50 and the forward limit of the opening 32, in addition to providing rigidity to the body 12 and a support for the seat 48, forms a safety bar to prevent a user falling out of the float downwardly through the opening 32 by reason of his respective legs disposed on opposing sides of the brace 46 when supported by the seat panel 50. The user's legs and feet are normally supported by a rodlike foot rest 54, U-shaped in configuration, having its leg portions 56 connected with eyes or loops 57 formed in the depending end of tubes 58 connected with the frame and depending therefrom and terminating adjacent the lowermost plane 14 of the body 12. A plurality of pickup arms 60 are secured in vertical parallel spaced relation to the frame 34 and project upwardly through the body terminating in closed loops or rings 61 for lifting and suspending the float in an out-of-the-way position.

Rearwardly of the seat and body opening 32, the body is provided with a recess or socket 62 dimensioned for the reception of a source of electrical energy, such as a battery, not shown, and other material necessary for the operation of a motor which is normally retained therein by a recess cover 63 shown by dotted lines (FIG. 1). A pair of battery recess supports 64 are connected respectively to the rearward end of the frame and the cross brace 40 in parallel spaced relation and are similarly imbedded in the body material below the lowermost limit of the socket 62. Similarly, a recess 65 is formed in the forward portion of the body 12 between the forward limit of the opening 32 and the front wall 16 for the reception of fishing articles, or the like, not shown.

A transom 66 is mounted on the forward limit of body. The transom comprises a vertically edgewise disposed panel 68 which is connected, as by bolts 70, to a pair of spaced-apart rods 72 positioned in coaxial alignment with respect to the frame legs 36. Each of the rods are provided with a diametrically reduced depending end or pin 74 which is cooperatively received in telescoping relation by the upwardly open end of the frame legs 36 thus supporting the transom in vertical edgewise relation parallel to the forward end wall 16 of the body 12.

A relatively small outboard motor, such as a trolling motor, indicated by dotted lines 76 (FIG. 1), is supported by the transom 66. Wiring, not shown, extends through the body from the socket 62 to a point adjacent the transom 66 for supplying electrical current to the motor 76. Obviously a conduit, not shown, may be imbedded in the body for containing the wiring in a conventional manner or the wire may be run through a portion of the frame.

The frame 34 is further provided with an auxiliary mounting position for the transom and motor comprising a similar pair of frame legs 36A connected with a lateral portion of the frame 34. The legs 36A extend upwardly in similar spaced parallel relation terminating in the upper plane of the body 12 adjacent the body side surface 22 for cooperative reception of the transom pins 74 thus positioning the motor 76 in a more easily accessible position with respect to an operator.

OPERATION

In operation the device 10 is positioned on a body of water adjacent the shore. The operator will normally wear wading boots and with the motor 76 positioned on the transom and other necessary equipment, not shown, in place the operator enters the float by stepping into the opening 32 facing toward the forward end 16, with his legs respectively disposed on either side of the longitudinal frame support 46. The operator, after moving the device to water sufficiently deep, sits on the seat 48 and places his feet on the foot support 54. Thereafter the float is progressively moved by operation of the motor 76.

Obviously the invention is susceptible to changes or alterations without defeating its practicability, therefore, I do not wish to be confined to the preferred embodiment shown in the drawings and described herein.

I claim:

1. A fishing float, comprising:
   a rigid buoyant body having a bow and a stern and having an upper and lower surface disposed in substantial parallelism, said body having a central opening defined by substantially vertical walls for loosely surrounding an occupant;
   a rigid frame embedded within the material forming said body, said frame having leg portions terminating upwardly in the plane of said upper surface and forming a transom support;
   seat means supported by said body below the plane of its upper surface; and,
   upstanding transom means comprising a rigid panel, and, a pair of rods secured in parallel spaced relation to one face of said rigid panel,
      said rods each having a depending end portion telescopically received by said frame legs.
2. Structure as specified in claim 1 and further including: crossmembers forming a part of said frame,
   said crossmembers extending in crossed relation across the opening of said body in the plane of said lower surface and forming a support for said seat means.
3. Structure as specified in claim 2 in which said seat means includes:
   a seat panel overlying the juncture of said crossmembers; and,
   a seat back connected with said seat panel and projecting beyond the plane of the upper surface of said body adjacent the body wall surface defining the opening.
4. Structure as specified in claim 3 and further including:
   a plurality of lifting loops secured to said frame and projecting above the plane of said upper surface.
5. Structure as specified in claim 4 in which said body is provided with at least one upwardly open article receiving recess in its upper surface.

* * * * *